Sept. 4, 1951  R. H. R. CUVILLIER  2,566,485
AUXILIARY OPTICAL DEVICE WITH
VARIABLE MAGNIFYING POWER
Filed Jan. 16, 1950
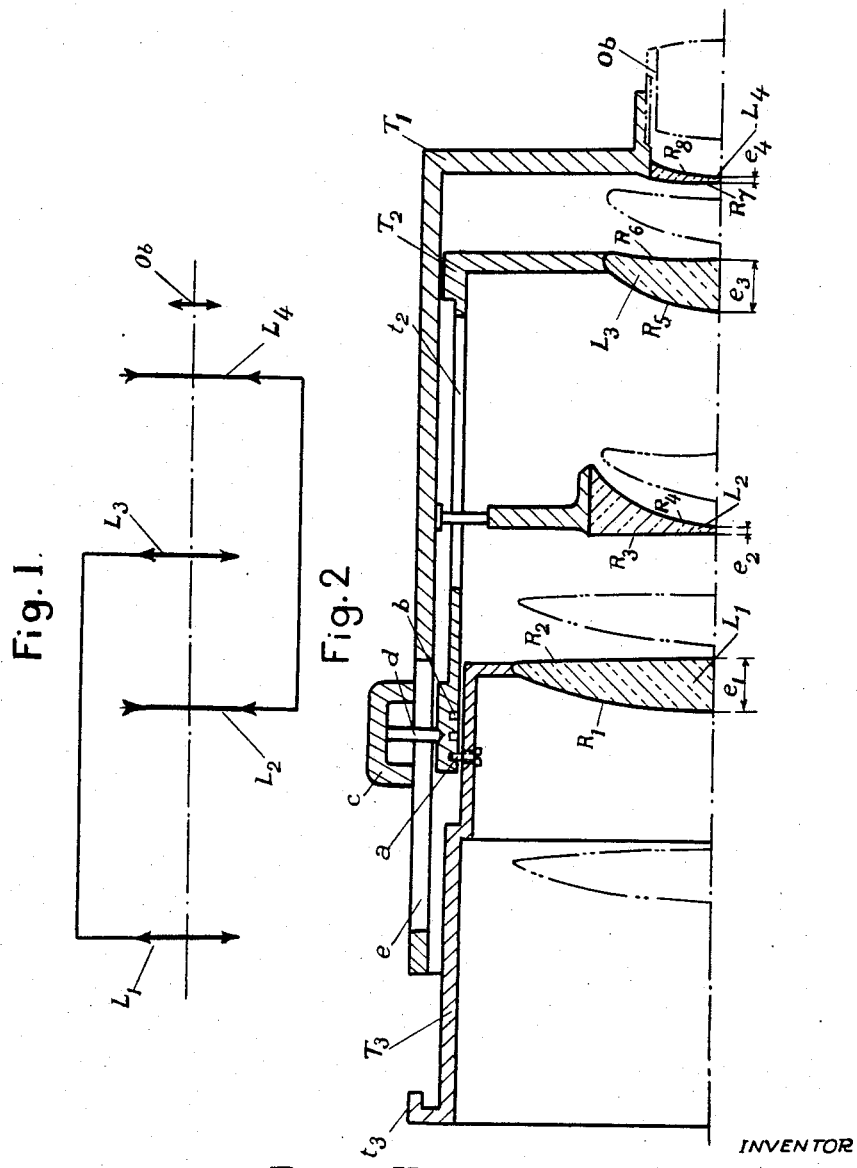
INVENTOR
Roger Henri Raymond Cuvillier.
BY Cameron, Kerkam & Sutton
ATTORNEYS Patented Sept. 4, 1951

2,566,485

UNITED STATES PATENT OFFICE 2,566,485

AUXILIARY OPTICAL DEVICE WITH VARIABLE MAGNIFYING POWER

Roger Henri Raymond Cuvillier, Paris, France, assignor to Société d'Optique & de Mecanique de Haute Precision, Paris, France, a joint-stock company of France Application January 16, 1950, Serial No. 138,764
In France January 28, 1949

4 Claims. (Cl. 88—57)

This invention relates to auxiliary optical devices, that is to say, devices for use in conjunction with another optical device such as the lens of a photographic camera.

Various optical devices are known which are made up of lenses having fixed positions and of one or more other lenses which are movable relatively to the fixed lenses for the purpose of obtaining infinite variations, within limits either of the magnifying power of the device itself or of the focal length of the objective with which the device is used.

One of these known systems comprises three lenses, of which two are divergent lenses having fixed positions and the other is a convergent lens arranged for movement between the other two. This device has the disadvantage that it is not afocal for all the intermediate positions of the movable lens so that when, for example, it is used in conjunction with a photographic camera, it is necessary to adjust the camera lens in order that the image may be properly focussed.

Auxiliary devices are also known having four, alternately convergent and divergent lenses, of which the two extreme lenses have fixed positions while the two intermediate lenses are movable in opposite directions towards and away from each other. Among other disadvantages, these devices have that of being afocal only in the two extreme settings of the movable lenses.

Complex optical combinations have also been proposed for the production, in a fixed plane, of an image the magnitude of which can be infinitely varied between fairly wide limits. These combinations, commonly called "variable focus objectives," have the disadvantage of comprising a number of movable elements, which have to be individually adjusted relatively to each other and to the fixed lenses. A complex adjusting mechanism has, therefore, to be provided which is apt to introduce precision errors which are inadmissible in optical instruments.

The present invention is an auxiliary afocal optical device having an infinitely variable magnifying power and comprising a pair of convergent lenses and a pair of divergent lenses arranged so that, considered in the direction of travel of the light, each convergent lens is followed by a divergent lens and so that one pair can be displaced as a pair along the optical axis relatively to the other.

An example of an auxiliary optical device in accordance with the invention is shown in the accompanying drawing, in which Fig. 1 illustrates diagrammatically the principle of the device;

Fig. 2 is an axial section through a practical embodiment of the device.

The diagram of Fig. 1 shows an auxiliary device mounted in front of an objective Ob such as a camera lens, and comprising two groups of lenses L1, L3 and L2, L4, the lenses in each group being rigidly connected to each other. The group L1, L3 is made up of two convergent lenses and is axially movable relatively to the group L2, L4 which is made up of two divergent lenses and is fixed. It will be seen that the convergent lenses alternate with the divergent lenses along the optical axis.

Any displacement of the movable group L1, L3 has the effect of varying the magnifying power of the auxiliary device and, therefore, the focal length of the associated objective.

It is, of course, possible to invert the arrangement, that is to say, to fix the convergent group and to make the divergent group movable. In either case, the device will be afocal, that is to say, will enable an image to be produced the position of which will remain fixed for all settings of the lenses. In any particular case, the most advantageous relative disposition of the lenses will depend upon the correction for aberration which has to be made.

It is known that for the spacing of the two lenses of the movable group L1, L3, and for the focal length of the lenses L1, L2, L3, values can be ascertained by calculation which are such that the image of an object at infinity given by the system remains in a fixed plane for all positions of the movable group. Such focal lengtns having been settled, it remains then only to choose for the fixed lens L4 a focal length and a distance from the first fixed lens L2 such that its focal plane coincides with the above-mentioned fixed image plane.

The device in accordance with the invention has been developed principally for use with cameras so as to enable the focal length of the camera lens to be varied infinitely without altering the position of the image. It can, however, be coupled to an instrument having an eye-piece, such as a Galilean telescope, in order to cause the magnifying power of the assembly to be varied continuously.

When the device is used in conjunction with a camera which is to serve for taking views not only of objects at infinity but also of near objects, a focussing adjustment is necessary. This cannot be done by an adjustment of the camera lens because, for a particular position of the object, the extent of the adjustment of the lens would be a function of the effective focal length of the lens at the instant in question, i. e. the focal length as modified by the auxiliary device.

It is, therefore, effected by an adjustment of the auxiliary device.

To enable that to be done, the position of the front lens L1 of the movable group is made adjustable relatively to the rear lens L3.

As is shown by Fig. 2, the two fixed lenses L2 and L4 are mounted in permanent positions in a barrel T1, the rear end of which can be screwed on to the mount of the camera lens Ob. The lens L3 of the movable group is mounted in a barrel T2 mounted to slide in the barrel T1. The barrel T has a longitudinal groove $t2$ through which passes a part $t4$ of the mount of the lens L2 so that it is prevented from turning in the fixed barrel T1. The lens L1 of the movable group is mounted in a barrel T3 through the wall of which passes a screw $a$ which is engaged in a helical groove $b$ in the barrel T2. Thus, by turning the barrel T3 by means of a knurled ring $t3$, the axial position of the lens L1 can be adjusted relatively to that of the lens L3.

When the device is focussed in this manner on to a near object, the object will remain in focus, as can easily be verified by trial, when the movable group of lenses is displaced in order to modify the magnifying power of the system. That displacement can be effected, as shown in Fig. 2, by means of a ring $c$ mounted to slide on the barrel T1 and having pins $d$ (only one is shown) which pass through slots $e$ in the barrel T1 and connect the ring to the barrel T3. Thus, the position of the lens L1 in the tube T2 is characteristic of the distance of the object, regardless of the magnitude of the image. This has the advantage of allowing a range finder to be coupled to the supporting tube T3 of the lens L1.

Two typical specifications of devices in accordance with the invention having a magnifying power of 4 to 1 are given below by way of example.

*Example I.*—Case of "thin" lenses, that is to say, lenses of a thickness which can be neglected in all practical calculations.

If the respective focal lengths of the lenses L1, L2, L3, L4, are designated by F1, F2, F3, F4, the specification of the device is as follows:

$F1 = +175$ mm.   $F3 = + 63.5$ mm.
$F2 = - 50$ mm.   $F4 = -113.5$ mm.
Separation L1–L3 = 75 mm.
Separation L2–L4 = 65 mm.
Distance L2–L3: varies from 5 to 55 mm.
Stroke of the movable group L1, L3: 50 mm.

*Example II.*—Case of "thick" lenses, that is to say, lenses of a thickness which has to be taken into account in practical calculations.

If the respective radii of curvature of the faces of the lens L1, L2, L3, L4 are designated respectively by R1, R2; R3, R4; R5, R6; R7, R8; the thicknesses of the lenses along the optical axis are designated by $e1$, $e2$, $e3$, $e4$; and the indices of refraction of the lenses are designated by $n1$, $n2$, $n3$, $n4$; the specification of the device is as follows:

L1 { $R1 = +108.7$ mm. $e1 = 10$ mm.
     $R2 = -30790$ mm. $n1 = 1.6226$

L2 { $R3 = -899.2$ mm. $e2 = 1$ mm.
     $R4 = +32.05$ mm. $n2 = 1.6204$

L3 { $R5 = +35.055$ mm. $e3 = 9$ mm.
     $R6 = +285$ mm. $n3 = 1.6226$

L4 { $R7 = +183.8$ mm. $e4 = 1$ mm.
     $R8 = +50.75$ mm. $n4 = 1.6226$

Spacing of the lenses of each group (between apices):
L1–L3 = 68.63 mm.
L2–L4 = 67.47 mm.

Possible stroke of the movable group: 50 mm.
Distance of the lenses L1, L2: 11.94 to 61.94 mm.

Distance of the lenses L3, L4: 2.78 to 52.78 mm.

The magnifying power in each of the two extreme positions of the movable group of lenses is 4–1.

When used in conjunction with an objective having a focal length of 25 mm. such as is suitable for 16 mm. cinematographic film, the device gives the objective a focal length which can be varied infinitely from 15 to 60 mm.

In the foregoing, it has been assumed that the four lenses of the device are simple lenses, but it is to be understood that as long as due regard is paid to corrections for chromatic abberation, they can be in the form of compound lenses.

What is claimed is:

1. An afocal auxiliary optical device of variable magnifying power for attachment to a camera comprising a barrel adapted to be connected at its rear end to the lens mount of the camera, a pair of divergent lenses housed in said barrel at fixed positions along its axis, a second barrel mounted for telescopic movement with respect to said first barrel, and a pair of axially separated convergent lenses housed in said second barrel and movable therewith as a unit, without variation in their separation, relatively to said pair of divergent lenses, one of said convergent lenses lying between the two divergent lenses and the other lying on the side of the divergent lenses remote from the rear end of said first barrel.

2. An afocal auxiliary optical device of variable magnifying power for attachment to a camera comprising a barrel adapted to be connected at its rear end to the lens mount of the camera, a pair of divergent lenses housed in said barrel at fixed positions along its axis, a second barrel telescopically mounted with respect to said first barrel, a pair of axially separated convergent lenses carried by said second barrel and movable therewith as a unit, without variation in their separation, relatively to said pair of divergent lenses, said convergent lenses being so arranged as to alternate with the divergent lenses along the axis of said barrels, and means for adjusting the axial position of one of said convergent lenses relatively to the other.

3. An afocal auxiliary optical device of variable magnifying power for attachment to a camera comprising a barrel adapted to be connected at its rear end to the lens mount of the camera, a pair of divergent lenses housed in said barrel at fixed positions along its axis, a second barrel telescopically mounted with respect to said first barrel, a pair of axially separated convergent lenses carried by said second barrel and movable therewith as a unit, without variation in their separation, relatively to said pair of divergent lenses, said convergent lenses being so arranged as to alternate with the divergent lenses along the axis of said barrels, one of said convergent lenses being fixedly mounted in said second barrel adjacent the rear end thereof and positioned between the two divergent lenses, and means for mounting the other convergent lens in the outer end of said second barrel for axial movement relatively to said fixedly mounted convergent lens.

4. An afocal auxiliary optical device of variable magnifying power for attachment to a camera comprising a barrel adapted to be connected at its rear end to the lens mount of the camera, a pair of divergent lenses housed in said barrel at fixed positions along its axis, a second barrel telescopically mounted with respect to said first barrel, a pair of axially separated convergent lenses carried by said second barrel and movable therewith as a unit, without variation in their separation, relatively to said pair of divergent lenses, said convergent lenses being so arranged as to alternate with the divergent lenses along the axis of said barrels, one of said convergent lenses being fixedly mounted in said second barrel adjacent the rear end thereof and positioned between the two divergent lenses, and a third barrel telescopically mounted in the outer end of said second barrel and supporting the other convergent lens for axial adjustment relatively to said fixedly mounted convergent lens.

ROGER HENRI RAYMOND CUVILLIER.

REFERENCES CITED

The following references are of record in the file of this patent:

UNITED STATES PATENTS

| Number | Name | Date |
|---|---|---|
| 756,779 | Dallmeyer | Apr. 5, 1904 |
| 1,094,724 | Konig | Apr. 28, 1914 |
| 2,107,305 | Ogle | Feb. 8, 1938 |
| 2,165,341 | Capstaff et al. | July 11, 1939 |
| 2,184,018 | Ort | Dec. 19, 1939 |
| 2,235,364 | Gramatzki | Mar. 18, 1941 |
| 2,324,057 | Bennet | July 13, 1943 |
| 2,501,219 | Hopkins et al. | Mar. 21, 1950 |

FOREIGN PATENTS

| Number | Country | Date |
|---|---|---|
| 622,046 | Germany | Jan. 3, 1938 |